(12) United States Patent
Joachimsmeyer et al.

(10) Patent No.: US 9,667,185 B2
(45) Date of Patent: May 30, 2017

(54) METHOD AND DEVICE FOR OPERATING AN ELECTROMOTIVE FAN DRIVE

(71) Applicant: Brose Fahrzeugteile GmbH & Co. KG, Wuerzburg, Wuerzburg (DE)

(72) Inventors: Dirk Joachimsmeyer, Hausen (DE); Martin Rauch, Randersacker (DE)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 0 days.

(21) Appl. No.: 14/966,364

(22) Filed: Dec. 11, 2015

(65) Prior Publication Data

US 2016/0099669 A1    Apr. 7, 2016

Related U.S. Application Data

(63) Continuation of application No. PCT/EP2014/001334, filed on May 16, 2014.

(30) Foreign Application Priority Data

Jun. 11, 2013 (DE) .................. 10 2013 009 680
Jul. 4, 2013 (DE) .................. 10 2013 011 143

(51) Int. Cl.
*H02P 6/34* (2016.01)
*B60H 1/00* (2006.01)
*H02P 7/285* (2016.01)
*H02P 6/08* (2016.01)
*H02P 29/032* (2016.01)

(52) U.S. Cl.
CPC ............... *H02P 7/285* (2013.01); *H02P 6/08* (2013.01); *H02P 29/032* (2016.02)

(58) Field of Classification Search
CPC . H02P 7/285; H02P 6/06; F04D 27/00; B60H 1/00; F24F 11/00
USPC ............... 318/268, 272, 448, 455, 478, 479
See application file for complete search history.

(56) References Cited

U.S. PATENT DOCUMENTS

| 3,345,549 | A * | 10/1967 | Hauser | H02P 27/026 |
| | | | | 318/799 |
| 6,779,981 | B2 * | 8/2004 | Huang | F04D 27/004 |
| | | | | 417/22 |
| 6,882,122 | B1 | 4/2005 | Sutter et al. | |
| 7,593,243 | B2 * | 9/2009 | Ganev | H02M 1/14 |
| | | | | 363/44 |
| 8,269,145 | B2 * | 9/2012 | Blanc | F02P 19/022 |
| | | | | 123/145 A |

FOREIGN PATENT DOCUMENTS

| DE | 44 08 442 A1 | 9/1995 |
| DE | 44 44 810 A1 | 6/1996 |
| DE | 198 55 424 A1 | 7/1999 |
| DE | 199 44 194 A1 | 3/2001 |

(Continued)

*Primary Examiner* — Bentsu Ro
(74) *Attorney, Agent, or Firm* — Muncy, Geissler, Olds & Lowe, P.C.

(57) ABSTRACT

A method and a device for operating a closed-loop or open-loop speed-controlled electric motor of a fan drive, which motor is connected to an on-board system voltage of a motor vehicle and the motor speed of which is set to a defined first desired speed, wherein, if the on-board system voltage fluctuates, the motor speed is set to a desired speed that is lower compared with the first desired speed.

4 Claims, 6 Drawing Sheets

(56) References Cited

FOREIGN PATENT DOCUMENTS

| | | |
|---|---|---|
| DE | 10 2010 048 747 A1 | 4/2012 |
| GB | 2 332 107 A | 6/1999 |
| JP | 05-236784 A | 9/1993 |

* cited by examiner

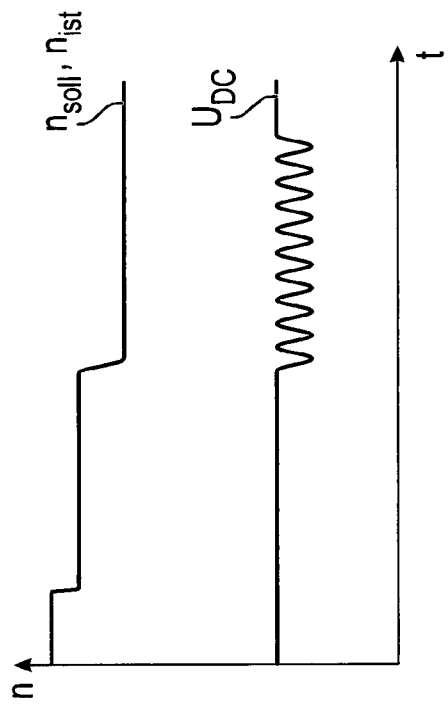
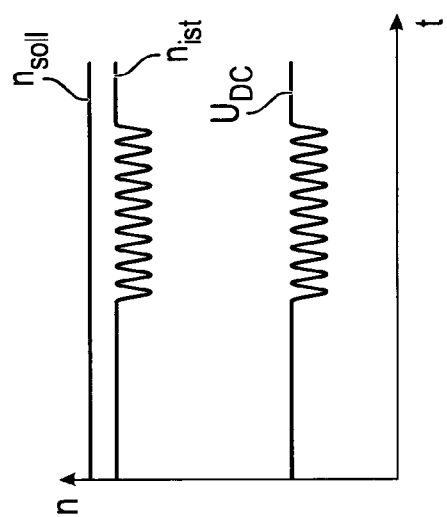
FIG. 4a
FIG. 4b

METHOD AND DEVICE FOR OPERATING AN ELECTROMOTIVE FAN DRIVE

This nonprovisional application is a continuation of International Application No. PCT/EP2014/001334, which was filed on May 16, 2014, and which claims priority to German Patent Application No. 10 2013 009 680.4, which was filed in Germany on Jun. 11, 2013, and German Patent Application No. 10 2013 011 143.9, which was filed in Germany on Jul. 4, 2013, and which are all herein incorporated by reference.

BACKGROUND OF THE INVENTION

Field of the Invention

The invention relates to a method and a device for operating an electromotive fan drive (fan) of a motor vehicle. A method in this case can be understood to mean, foe example, a control method for the speed control of a brushless electric motor of an electromotively driven fan of a motor vehicle by means of a closed-loop or open-loop device, the motor being connected to an on-board system voltage. A fan can be understood to mean, for example, a so-called HVAC fan (HVAC=Heating, Ventilation, and Air Conditioning) or a radiator cooling fan of the motor vehicle, especially of a heating and/or climate control fan drive.

Description of the Background Art

Closed-loop speed controls of fan and/or ventilator motors, used in a motor vehicle and exposed to the effect of fluctuating operating voltages, and corresponding closed-loop or open-loop control circuits are known, for example, from DE 44 08 442 A1, from DE 44 44 810 A1, from DE 198 55 424 A1, and from DE 10 2010 048 747 A1. The known open-loop or closed-loop control methods are based substantially on a change in the pulse duty factor of semiconductor switches, controlled by means of pulse width modulation (PWM), in the load circuit of the electric motor of an electromotive fan drive as a function of a fluctuating operating or on-board system voltage.

Because of the closed-loop control of the speed of such an electric motor or electromotive fan drive, in particular at a maximum or hundred percent modulation of the closed-loop speed control, speed oscillations can occur as is known, when the on-board electrical system, particularly an on-board system voltage and/or an on-board system current, of the motor vehicle fluctuates. Such oscillations in the on-board electrical system can also be desirable in relation to operation or usage or be required, for example, for the recuperation of the vehicle battery. In this case, for example, voltage variation gradients of 3 V/s at desired generator voltages of a maximum of 15.5 V and a minimum of 12 V can occur.

Such oscillations are acoustically perceptible, therefore audible, in the fan airflow. It is frequently necessary, therefore, accordingly to overdesign the electric motor in order to provide or make available actuating reserves. A further aspect is that the maximum achievable speed of an HVAC system depends on one or more flap positions of a climate control device; therefore, it is load-dependent and cannot be limited to a fixed value. Other operating conditions in the vehicle can also be the cause of load variations or load changes. Therefore, the employed drive motor can be accordingly cost-intensive and/or a maximum airflow (100% airflow) cannot be utilized in the vehicle.

The disadvantages are expected particularly in a brush motor and/or a brushless DC motor, which simulates a brush motor, because due to the system it must have a suitable actuating reserve. The so-called direct current or DC emulation (reproduction of the DC characteristic) means that the arising motor speed based on a set point predefined by an operating unit decreases with an increasing motor current.

SUMMARY OF THE INVENTION

It is therefore an object of the invention to provide an especially suitable method for operating an electromotive fan drive (fan) of a motor vehicle and a device operating in accordance therewith. The fan is to operate especially as quietly as possible. To this end, acoustic effects resulting from fluctuations in an on-board electrical system supplying the fan drive are to be suitably limited.

In an exemplary embodiment, a method is provided for operating a closed-loop or open-loop controlled electric fan drive motor which is connected to an on-board voltage of a motor vehicle and whose motor speed is regulated to a predetermined first desired speed. If the on-board system voltage fluctuates, the motor speed is regulated to a desired speed that is lower in comparison with the first desired speed. The motor speed of the electric motor is suitably regulated depending on the current flap position of a fan functioning as the HVAC system and/or depending on the current motor load of the electric motor.

In an embodiment, the motor speed can be regulated for a predetermined or predeterminable time to a desired speed that can be set depending on the voltage and/or load fluctuations. The desired speed may be lower than a predetermined maximum speed. This time-limited, closed-loop speed control occurs expediently during a set timing element. This time-limited, closed-loop speed control can also occur to a desired speed reduced compared with a maximum speed or with a first desired speed and after the timing element has run out again to the maximum speed or to the first desired speed.

According to an embodiment, it can be provided that proceeding from a starting level depending on the course of an especially first-time voltage drop in the on-board system voltage, a, preferably maximum, desired speed is reduced first to a transitional or intermediate level and after a first timing element or a first period of time has run out is kept constant at the reduced level and after the first and/or a second timing element or a second period of time has run out is again set to the starting level. In addition or alternatively, the (maximum) desired speed can be reduced from the initial level as a function of the load course or a load rise initially to the transitional or intermediate level and after the first timing element or the first period of time has run out kept constant at the reduced level, as well as after the first or second timing element (second period of time) has run out again set to the starting level.

The device for the speed control of an electromotive fan drive, for example, an HVAC system of a motor vehicle, comprises a power switch, controlling the electric motor, in the form of a plurality of semiconductor switches connected in a bridge circuit, which switch(es) is (are) connected in a load current circuit supplied with an on-board system voltage. Moreover, the device comprises a controller (closed-loop control device or control circuit), which is provided and set up to carry out the method of the invention in terms of programming and/or circuitry.

It is therefore provided according to the invention that the electric motor, driving the fan, learns and/or stores the maximum possible speed, particularly for the instantaneous flap position of an HVAC system, as soon as the controller reaches above a to-be-defined threshold or this threshold is exceeded within a closed-loop control unit (device). During the operation of the fan drive, therefore, depending on the current flap position and/or depending on a current motor load, the motor speed is regulated first to the predetermined first desired speed and then to a desired speed that is lower compared with the first desired speed, when the on-board system voltage and/or the load of the load current circuit fluctuate.

By means of the closed-loop or open-loop control device, the motor speed of the fan drive or the electric motor thereof is suitably regulated for the predetermined time, therefore during the set time interval or timing element, to the desired speed, which is set depending on the voltage and/or load fluctuations and is lower than the predetermined maximum speed. In this regard, the motor speed is regulated expediently during the timing element to a desired speed, reduced compared with the maximum speed or a first desired speed, and only after the timing element has run out again regulated to the maximum speed or to the first desired speed.

In an exemplary embodiment, proceeding from a starting level, especially depending on the course of a (first-time) voltage drop in the on-board system voltage and/or depending on the load course and/or a load rise, a first, preferably maximum, desired speed is first reduced to a transitional or intermediate level and after a first timing element or a first period of time has run out is kept constant at the reduced level and after the first and/or a second timing element or a second time interval has run out again set to the starting level.

The advantages achieved with the invention include that under virtually all operating conditions the fan can always be utilized with an at least approximately hundred percent performance with simultaneously acceptable acoustic disturbances (e.g., beat vibrations), in that the fan constantly relearns the maximum speed and thereby the maximum airflow. This advantageously has the result that the drive motor (electric motor) does not need to be overdesigned and simultaneously can be produced cost-effectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 4a and 4b show the speed course depending on the on-board system voltage with and without sinusoidal voltage fluctuations with or without speed variation;

DETAILED DESCRIPTION

Figure 1:
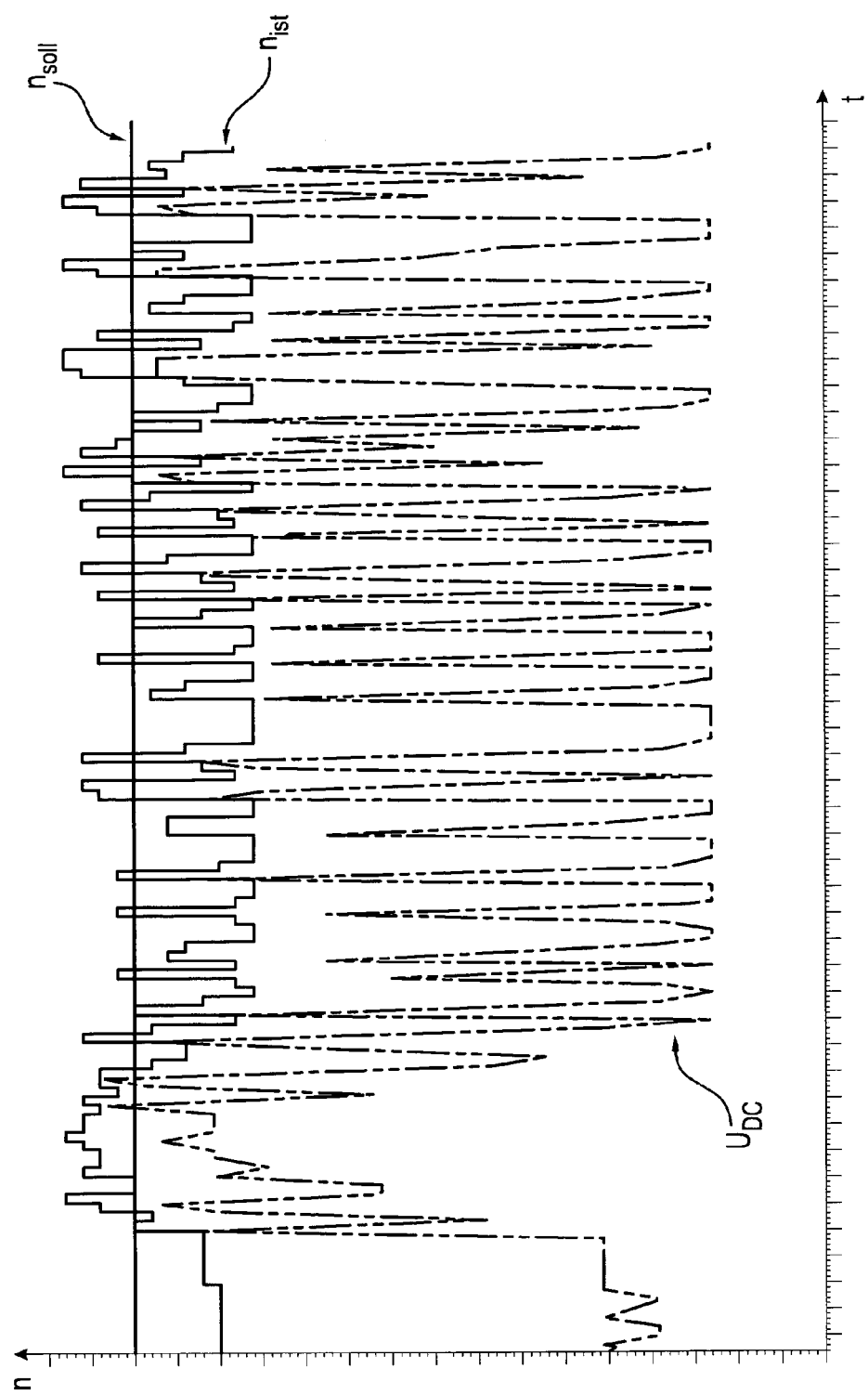
FIG. 1 in a speed-time diagram shows the course of a time-variable on-board system voltage ($U_{DC}$) and an actual speed, behaving synchronously hereto, (speed course or actual speed course) ($n_{act}$) and a course of a desired speed ($n_{des}$), constant over time.

FIG. 1 shows the course of the actual speed $n_{act}$, the course varying with the on-board system voltage $U_{DC}$ at a modification limit, for example, in the case of a maximum motor voltage, at a predetermined desired speed $n_{des}$ of an electric motor driving a vehicle fan. In the left part of the diagram, the actual speed $n_{act}$ at a suitably low on-board system voltage $U_{DC}$ does not noticeably attain the desired speed $n_{des}$. Over time t, relatively great speed fluctuations in the course of the actual speed $n_{act}$ can be seen, the course changing synchronously with the course of the on-board system voltage $U_{DC}$, around the desired speed $n_{des}$. Such a speed behavior of an electromotive fan or ventilator drive as is known leads to undesirable noise generation, for example, in the passenger compartment of the motor vehicle.

Figure 2:
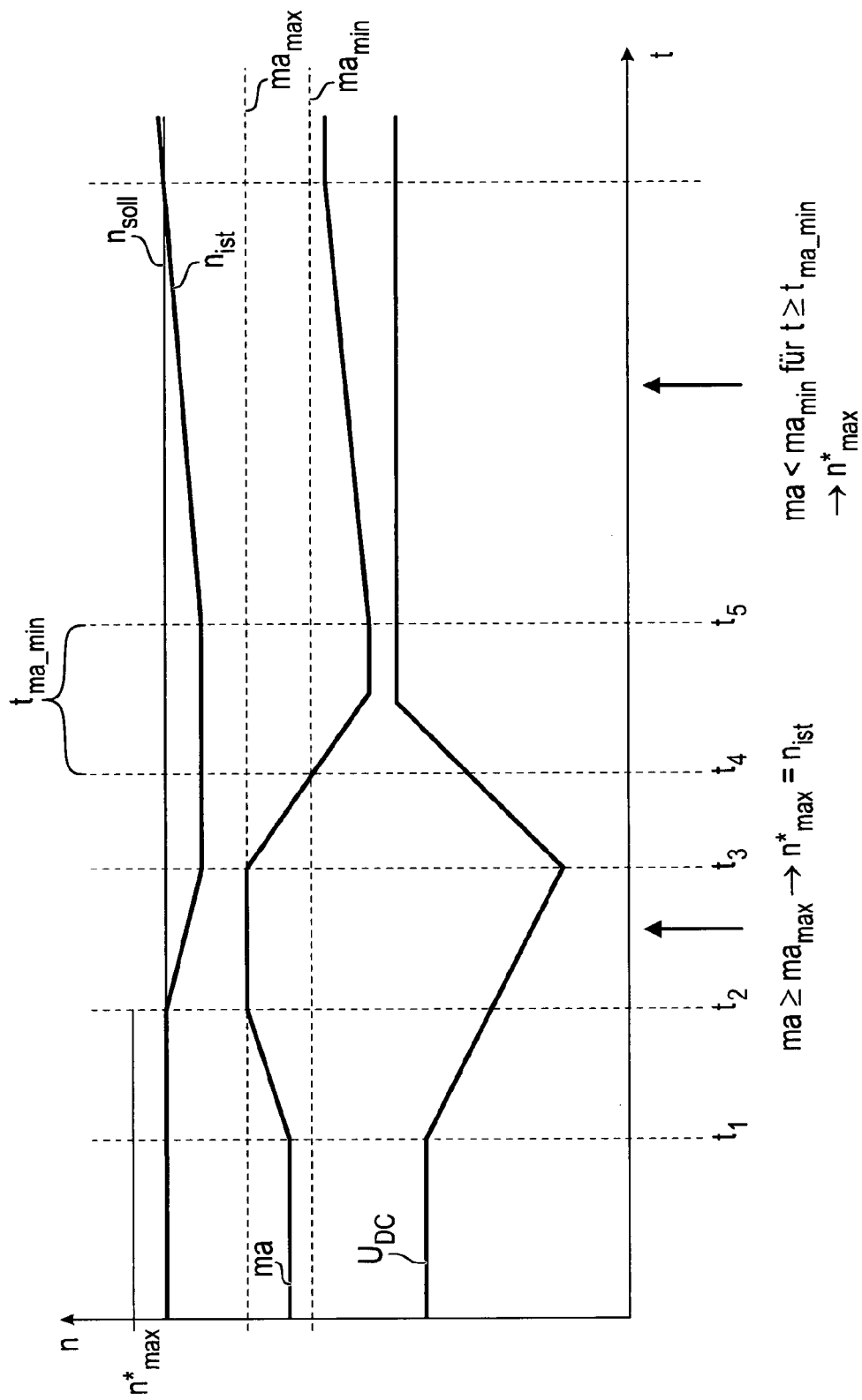
FIG. 2 in a diagram according to FIG. 1 shows an example of a speed variation due to on-board system fluctuations in the case of a drop and subsequent recovery of the on-board system voltage including a temporal modification course (ma)
Figure 3:
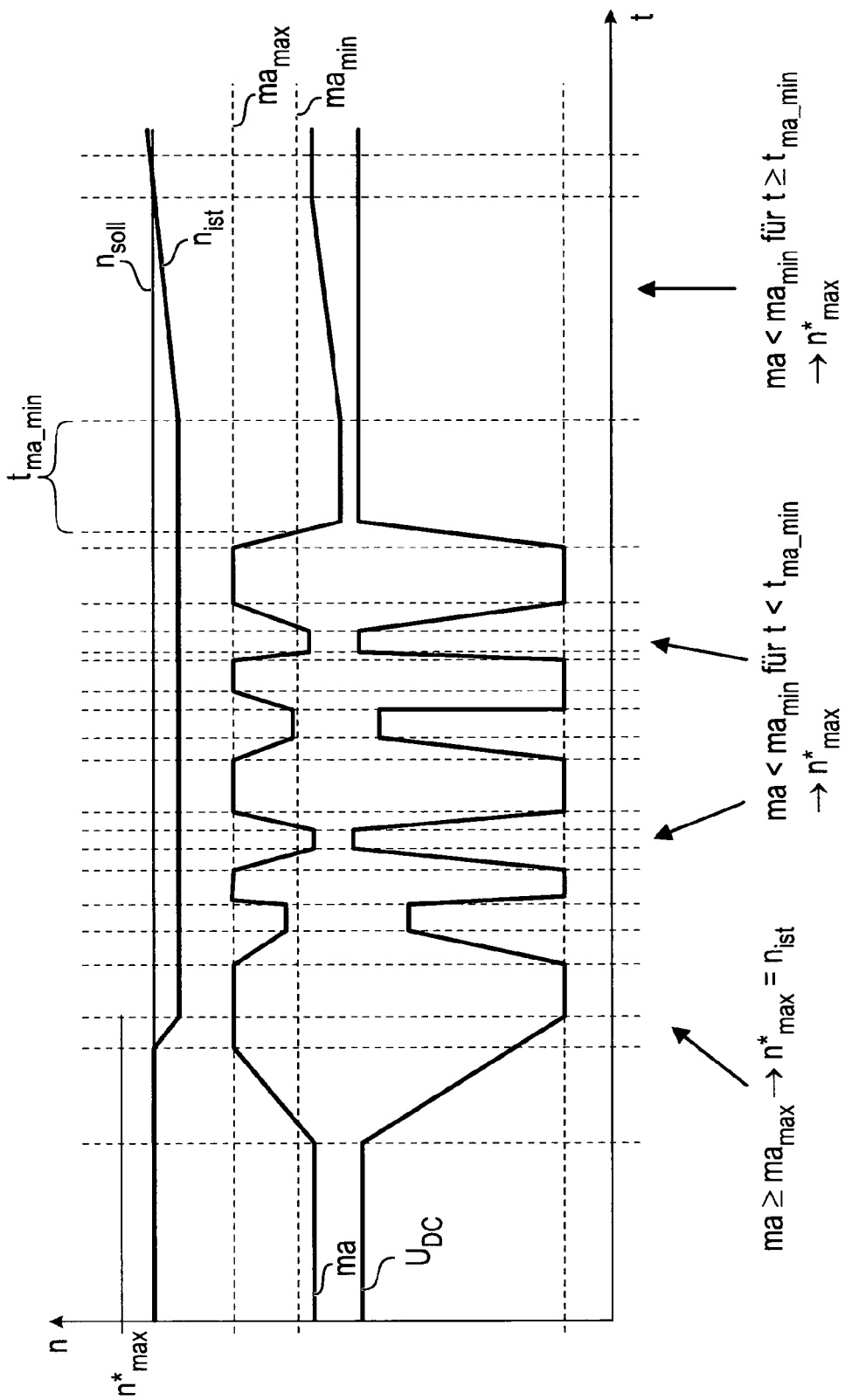
FIG. 3 in an illustration according to FIG. 2 shows the variation in the speed due to on-board system fluctuations in the case of an on-board system voltage, varying repeatedly (variably) over time, for example, due to recuperation.

FIGS. 2 and 3 in similar diagrams during an initially approximately constant on-board system voltage $U_{DC}$ show a virtually complete overlapping of the actual speed $n_{act}$ with the desired speed $n_{des}$. At a specific time $t_1$, the on-board system voltage $U_{DC}$ decreases ramp-like to a minimum value at time $t_3$, to then increase again ramp-like to an elevated level.

Whereas FIG. 2 shows the speed variation, i.e., particularly the adjustment of the desired speed $n_{des}$ to a local voltage drop of the on-board system voltage $U_{DC}$, FIG. 3 illustrates a speed variation in the case of, for example, a recuperation with repeated voltage drops and voltage rises of the on-board system voltage $U_{DC}$.

The course of a modulation amplitude ma of a closed-loop speed control is shown above the course of the on-board system voltage $U_{DC}$. The modulation amplitude ma in the time interval between a time $t_2$ and time $t_3$ reaches a maximum value $ma_{max}$ and at a time $t_4$ falls below a minimum value $ma_{min}$. During the time interval $t_3$-$t_2$, the desired speed $n_{des}$ is reduced and remains at this level until time $t_5$, at which a timing element $\Delta t = t_{ma\_min}$ has run out since time $t_4$ at which the value fell below the minimum value $ma_{min}$ of the modulation amplitude ma. Starting at this time $t_5$, the desired speed $n_{des}$ is increased continuously to the original level.

In principle, accordingly the maximum speed $n^*_{max}$ of the fan drive or of the electric motor is determined based on the modulation amplitude ma of a closed-loop control or a controlled power element and reduced if necessary, i.e., if a maximum value $ma_{max}$ is exceeded. If a decrease in the modulation amplitude ma is detected over a rather long time period t, then a stepwise increase of the allowed maximum speed takes place. The modulation amplitude ma in this case is defined as the current output voltage in relation to the maximum possible output voltage.

Similarly, in the case of the course of the on-board system voltage $U_{DC}$ according to FIG. 3, the desired speed $n_{des}$ is reduced with the falling edge of the on-board system voltage $U_{DC}$. Next, the desired speed $n_{des}$ runs constantly at a relatively low level, whereby this low desired speed is preferably set when the lowest voltage value of the operating voltage $U_{DC}$ is achieved.

As long as the modulation amplitude ma is smaller than a minimum value $ma_{min}$ for a time $t<t_{ma\_min}$, the maximum desired speed $n^*_{max}$ is not increased; i.e., the internal maximum speed remains constant (ma<$ma_{min}$ for <$t_{ma\_min} \rightarrow n^*_{max}$). If the modulation amplitude ma is greater or equal to the maximum modulation amplitude $ma_{max}$, thus, the maximum desired speed $n^*_{max}$ is equated to the actual speed $n_{act}$; i.e., the internal maximum speed is carried along (ma≥$ma_{max} \rightarrow n^*_{max}=n_{act}$). If the modulation amplitude ma is smaller than the minimum value $ma_{min}$ for a time $t≥t_{ma\_min}$, thus, the maximum desired speed $n^*_{max}$ is slowly increased (ma<$ma_{min}$ for $t≥t_{ma\_min} \rightarrow n^*_{max}$).

FIGS. 4a and 4b show the result of a test of the functionality of the closed-loop or open-loop control in the case of an on-board system voltage $U_{DC}$=12 V with and without a superimposed sine with 1 $V_{pp}$/2 Hz. FIG. 4a shows the upper course of the desired speed value (desired speed) $n_{des}$ and the current speed (actual speed) $n_{act}$ resulting from the on-board DC voltage $U_{DC}$ superimposed with a sine (sine curve). The actual speed varies noticeably synchronously to the fluctuations of the on-board system voltage. FIG. 4b shows the result of the closed-loop speed control resulting from a selective decrease of the desired speed (speed variation) $n_{des}$ in the case of sinusoidal fluctuations in the on-board system voltage $U_{DC}$. The closed-loop control is capable of adjusting the actual speed $n_{act}$ not only before the occurrence of the sinusoidal voltage fluctuations, but rather also after a decrease in the desired speed $n_{des}$ to its value without notable speed fluctuations.

As a result, because of the reduced speed fluctuations in the case of arising voltage and/or load fluctuations, acoustic effects and thereby noise generation are minimized, which occur due to relatively highly fluctuating motor speeds.

Figure 5:
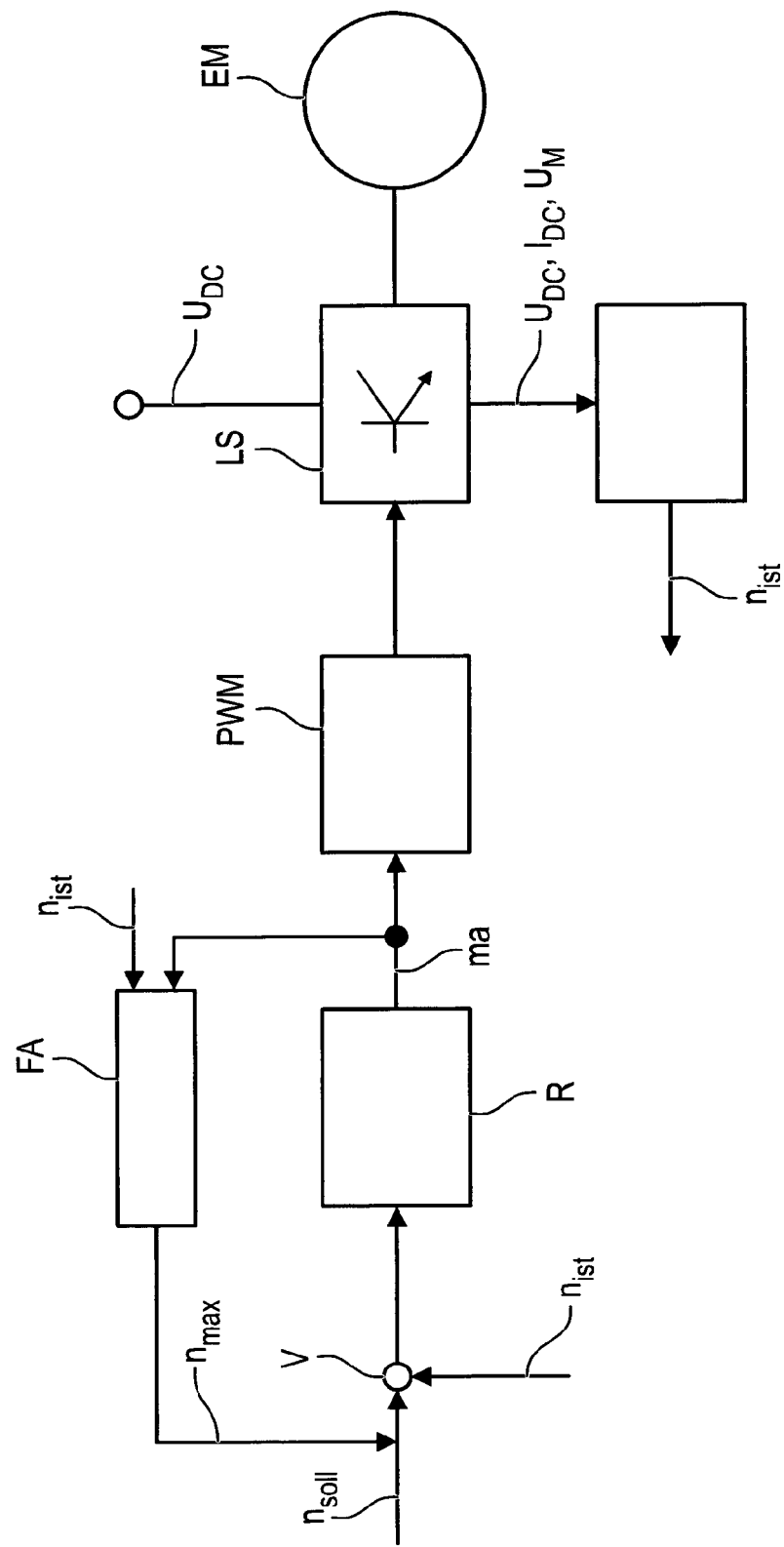
FIG. 5 in a block diagram shows a closed-loop control circuit for closed-loop speed control and/or speed variation resulting from on-board system fluctuations in a first embodiment.

FIG. 5 in a basic, simplified block diagram shows a closed-loop control circuit or a device for closed-loop speed control or speed variation resulting from on-board system or power fluctuations of an electric motor EM driving a fan (not shown in greater detail). A power switch arrangement LS, which is called a power switch below and can be made up of a number of power switches, for example, MOSFETs, connected in an H-bridge circuit, is associated with the motor. The power switch LS controlling electric motor EM is connected to a load current circuit which is supplied with the on-board system voltage $U_{DC}$.

A PWM unit PWM (pulse width modulation), which controls power switch LS, is placed upstream of power switch LS. Placed upstream of the PWM unit PWM is a controller R, to which on the input side the set value, determined by a comparator V, is supplied as a set, control, or reference variable from the actual speed $n_{act}$ and a desired speed $n_{des}$ or a modified desired speed.

The modification of the desired speed $n_{des}$ occurs based on a speed correction value designated as $n_{max}$, which is determined by means of a function block FA, preferably realized as software, with an algorithm for minimizing speed fluctuations. The function block FA is supplied, on the one hand, with the actual speed $n_{act}$ and, on the other, with the current modulation amplitude ma, which can be tapped on the output side of controller R.

The actual speed $n_{act}$ is determined by means of a sensor or without a sensor, for example, from the electromotive force (EMF, $U_{EMF}$) of electric motor EM. The electromotive force, on the one hand, is proportional to the speed n and, on the other, can be determined from the difference of the on-board system voltage $U_{DC}$ and the current motor voltage $U_M$.

Figure 6:
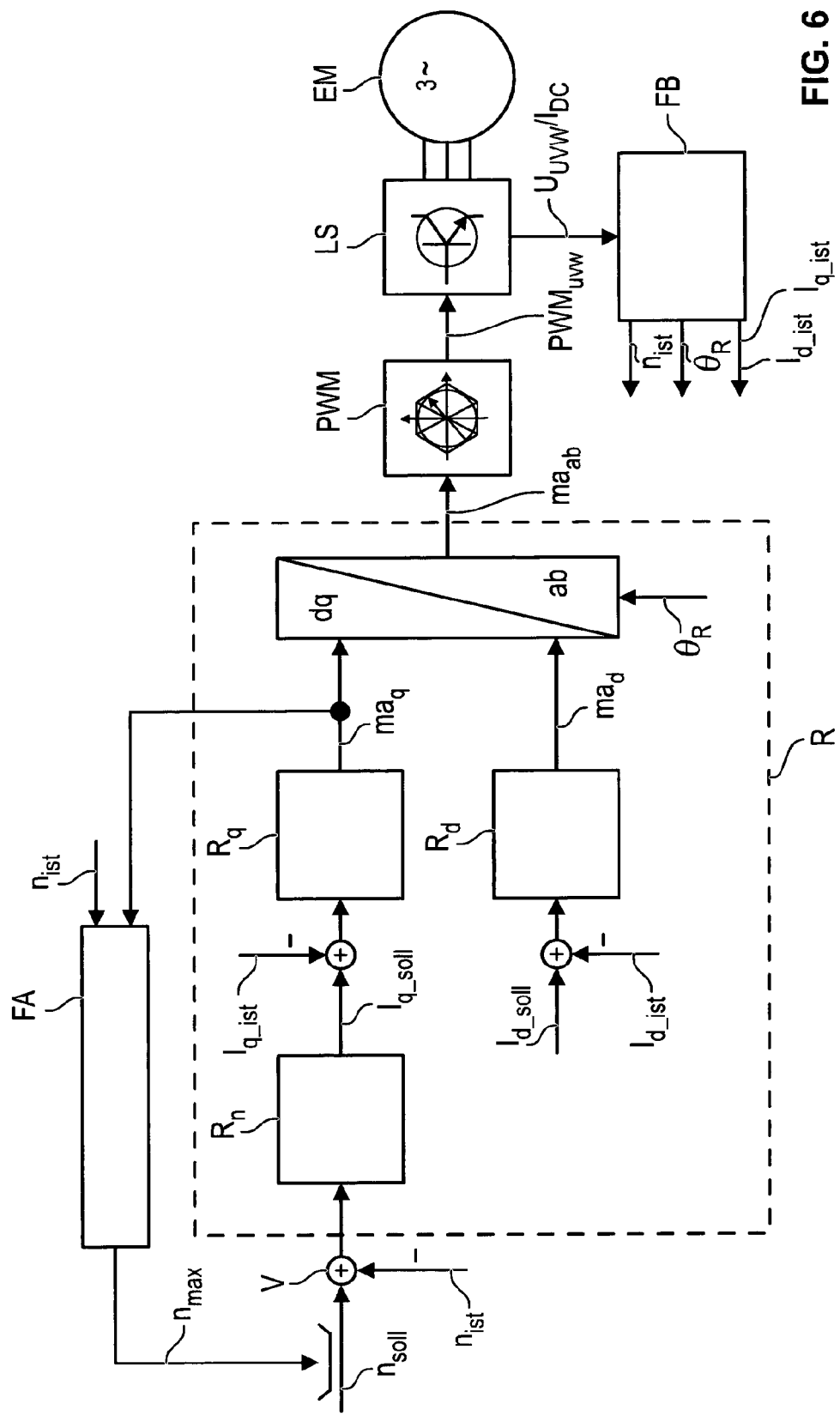
FIG. 6 in a block diagram shows a closed-loop control circuit for closed-loop speed control and/or speed variation resulting from on-board system fluctuations in a second embodiment.

FIG. 6 shows a relatively complex closed-loop control circuit for speed variation, especially as a result of on-board system fluctuations. In the exemplary embodiment according to FIG. 6, suitable desired values of the phase currents of the electric motor EM are set with $I_{d\_des}$ (without field weakening OA) and $I_{q\_des}$. Thus, the control variable of an $I_q$ controller $R_q$ and/or that of an $I_d$ controller $R_d$ are used in simple manner as modulation amplitude ma with consideration of the rotor position $θ_R$ of the electric motor EM, whereby $ma_q$ corresponds to the control variable or the maximum control variable and $ma_{ab}$ to the control variable derived therefrom for PWM unit PWM.

The determination of the actual speed (actual speed value) $n_{act}$ and the rotor position $θ_R$ of the electric motor EM and the determination or calculation of the actual values of the phase currents $I_{q\_act}$ and $I_{d\_act}$ occur by means of a function block FB from the (three-phase) motor voltage $U_{uvw}$ and the motor current $I_{DC}$ of electric motor EM. To this end, power switch LS in the exemplary embodiment is suitably made as a function block in a B6 circuit. From the foregoing, the speed, rotor position, and the particular phase current of electric motor EM can be derived especially simply and reliably from the variables or parameter $U_{uvw}$ for the voltages of the individual phases u, v, w, and $I_{DC}$ for the motor current.

The invention is not limited to the exemplary embodiments described above. Rather, other variants of the invention can also be derived herefrom by the skilled artisan, without going beyond the subject matter of the invention. Particularly, further all individual features described in relation to the exemplary embodiments can also be combined with one another in a different manner, without going beyond the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a closed-loop or open-loop controlled electric motor of a fan drive, the method comprising:
   connecting the motor to an on-board system voltage of a motor vehicle;
   regulating a motor speed of the motor to a predetermined first desired speed, wherein the motor speed is regulated to a desired speed that is lower in comparison with the first desired speed if the on-board system voltage fluctuates,
   wherein proceeding from a starting level depending on a course of a voltage drop in the on-board system voltage, a desired speed is reduced first to a transitional or intermediate level and after a first timing element or a first period of time has run out is kept constant at the reduced level, and after the first and/or a second timing element or a second period of time has run out is again set to the starting level.

2. The method according to claim 1, wherein the motor speed of the electric motor is regulated depending on a current flap position of a fan functioning as the HVAC system and/or depending on a current motor load of the electric motor.

3. A device for the closed-loop speed control of an electromotive fan drive or an HVAC system of a motor vehicle, the device comprising:
- a power switch that controls the electric motor and is connected to a load current circuit supplied with an on-board system voltage; and
- a controller that is provided and set up to carry out the method according to claim 1 for programming and circuitry.

4. A method for operating a closed-loop or open-loop controlled electric motor of a fan drive, the method comprising:
- connecting the motor to an on-board system voltage of a motor vehicle;
- regulating a motor speed of the motor to a predetermined first desired speed, wherein the motor speed is regulated to a desired speed that is lower in comparison with the first desired speed if the on-board system voltage fluctuates,
- wherein proceeding from a starting level depending on the load course or a load increase, a desired speed is reduced first to a transitional or intermediate level and after a first timing element or a first time interval has run out is kept constant at the reduced level and after the first and/or a second timing element or a second time interval has run out is again set to the starting level.

* * * * *